US008429348B2

(12) United States Patent
Factor et al.

(10) Patent No.: US 8,429,348 B2
(45) Date of Patent: Apr. 23, 2013

(54) METHOD AND MECHANISM FOR DELAYING WRITING UPDATES TO A DATA CACHE

(75) Inventors: Michael E. Factor, Haifa (IL); Shachar Fienblit, Ein Ayala (IL); Rivka Mayraz Matosevich, Zichron-Ya'acov (IL)

(73) Assignee: International Business Machines Corporation, Armonk, NY (US)

( * ) Notice: Subject to any disclaimer, the term of this patent is extended or adjusted under 35 U.S.C. 154(b) by 696 days.

(21) Appl. No.: 12/403,532

(22) Filed: Mar. 13, 2009

(65) Prior Publication Data

US 2010/0235582 A1     Sep. 16, 2010

(51) Int. Cl.
*G06F 12/00* (2006.01)
(52) U.S. Cl.
USPC ..... 711/118; 711/133; 711/167; 711/E12.069
(58) Field of Classification Search .................. None
See application file for complete search history.

(56) References Cited

U.S. PATENT DOCUMENTS

| | | | |
|---|---|---|---|
| 4,310,883 A * | 1/1982 | Clifton et al. ................. 364/200 | |
| 6,629,211 B2 | 9/2003 | McKnight et al. | |
| 6,829,682 B2 | 12/2004 | Kirihata et al. | |
| 7,167,963 B2 | 1/2007 | Hirakawa et al. | |
| 2004/0260882 A1 * | 12/2004 | Martinez et al. ............... 711/133 |
| 2005/0050279 A1 * | 3/2005 | Chiu et al. ..................... 711/137 |
| 2006/0224849 A1 * | 10/2006 | Rezaul Islam et al. ....... 711/170 |
| 2007/0073986 A1 | 3/2007 | Ninose et al. | |
| 2007/0198700 A1 | 8/2007 | Vivian et al. | |
| 2008/0052456 A1 | 2/2008 | Ash et al. | |
| 2008/0270692 A1 * | 10/2008 | Cochran et al. ............... 711/114 |

* cited by examiner

*Primary Examiner* — Jasmine Song
*Assistant Examiner* — Daniel Bernard
(74) *Attorney, Agent, or Firm* — Zilka-Kotab, PC

(57) ABSTRACT

A novel and useful mechanism and method for writing data updates to a data cache subsystem of a storage controller. Updates received by the storage controller requiring storage allocation on a repository volume are delayed prior to being written to the data cache subsystem. The delay is based on the storage utilization of the repository volume. As the utilization of the repository volume increases, the cache write delay increases, thereby limiting the possibility that there will still be any updates in the data cache subsystem waiting to be destaged to the repository volume when the repository volume is fully utilized. When the repository volume is fully utilized all writes to the data cache of updates that will cause destage of tracks in the repository volume are stopped, thereby causing an infinite delay.

25 Claims, 4 Drawing Sheets

ND MECHANISM FOR
METHOD AND MECHANISM FOR DELAYING WRITING UPDATES TO A DATA CACHE

FIELD OF THE INVENTION

The present invention relates to the field of storage controllers, and more particularly relates to a method and mechanism of delaying writing of data to a data cache subsystem of a storage controller.

SUMMARY OF THE INVENTION

There is thus provided in accordance with the invention, a method of storing a data element in a data cache, said data element to be destaged from the data cache to a repository volume of a storage system, the storage system comprising one or more repository volumes, the method comprising the steps of assigning a delay value to be associated with the data element and delaying writing of the data element to the data cache by a time duration determined in accordance with the assigned delay value.

There is also provided in accordance of the invention, a computer program product for storing a data element in a data cache, the data element to be destaged from the data cache to a repository volume of a storage system, the storage system comprising one or more repository volumes, comprising a computer usable medium having computer usable code embodied therewith, the computer program product comprising computer usable code configured for assigning a delay value to be associated with the data element and computer usable code configured for delaying writing of the data element to the data cache by a time duration determined in accordance with the assigned delay value.

There is further provided a storage controller, comprising a communications subsystem operative to receive one or more data elements to be destaged to a repository volume of a storage system, a data cache subsystem operative to store the one or more data elements and a scheduling subsystem operative to delay writing each data element to the data cache subsystem by a time duration.

There is also provided a method of storing one or more data elements in a repository volume of a storage system, the storage system comprising one or more repository volumes, the method comprising the steps of assigning a delay value associated with each data element, writing each data element to a data cache after a time delay determined in accordance with its associated delay value and destaging the written data element from the data cache to the repository volume of the storage system.

BRIEF DESCRIPTION OF THE DRAWINGS

The invention is herein described, by way of example only, with reference to the accompanying drawings, wherein.

DETAILED DESCRIPTION OF THE INVENTION

Notation Used Throughout

Figure 1:
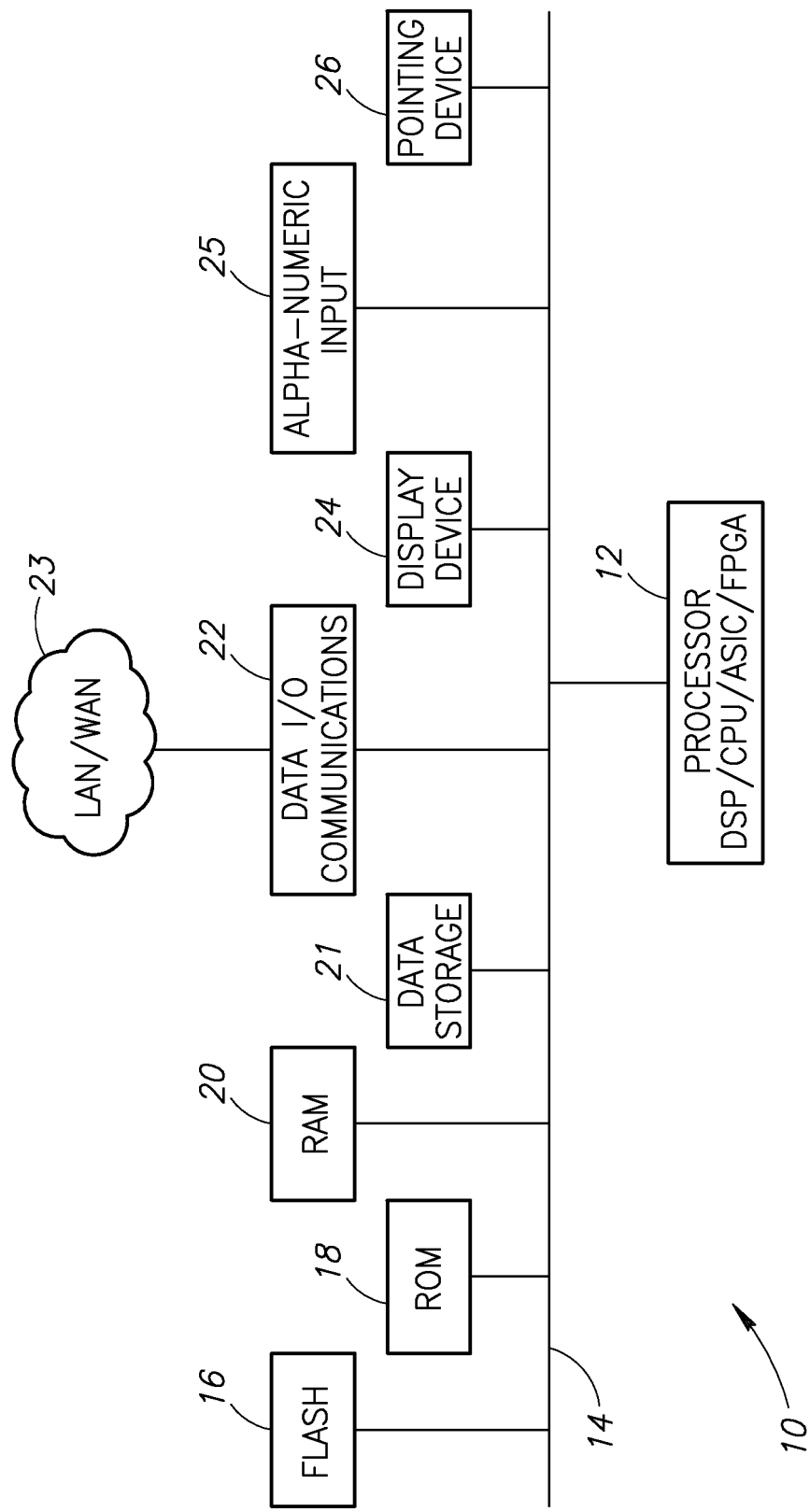
FIG. 1 is a block diagram illustrating an example computer processing system adapted to implement the storage controller data cache write delay method of the present invention.

The following notation is used throughout this document:

| Term | Definition |
| --- | --- |
| ASIC | Application Specific Integrated Circuit |
| CD-ROM | Compact Disc Read Only Memory |
| CPU | Central Processing Unit |
| DSP | Digital Signal Processor |
| EEROM | Electrically Erasable Read Only Memory |
| EPROM | Erasable Programmable Read-Only Memory |
| FPGA | Field Programmable Gate Array |
| FTP | File Transfer Protocol |
| HTTP | Hyper-Text Transport Protocol |
| I/O | Input/Output |
| LAN | Local Area Network |
| NIC | Network Interface Card |
| RAM | Random Access Memory |
| RF | Radio Frequency |
| ROM | Read Only Memory |
| URL | Uniform Resource Locator |
| WAN | Wide Area Network |

Detailed Description of the Invention

The present invention is a method and mechanism of writing updates (i.e. data) to a data cache subsystem of a storage controller. When an update is received by the storage controller, the method of the present invention delays writing the update to the data cache subsystem based on the storage utilization of the repository volume (i.e. a disk volume) of the storage system coupled to the storage controller. As the repository volume's utilization increases, the data cache write delay increases, thereby limiting the possibility that there will still be any updates in the data cache subsystem waiting to be destaged to the repository volume when the repository volume is fully utilized. Note that the data cache write delay is employed for updates requiring allocation of new tracks on the repository volume.

In operation, the storage controller determines if a received update requires allocation of new storage tracks in the repository volume. If no allocation is required then the update is written to the data cache subsystem without being subject to a delay. If allocation is required then writing the update to the data cache subsystem is delayed by a calculated value based on the storage utilization of the repository volume. As the repository volume is increasingly utilized, the delay of writing the update to the data cache increases.

One application of the invention is to facilitate the development of storage controllers which allocate storage space on a repository volume when destaging an update from the storage controller data cache to the repository volume (as opposed to storage controllers which allocate storage space on a repository volume when an update is written to the data cache). Storage controllers implementing the data cache write delay method of the present invention will reduce possibility for a repository volume of a storage system being fully utilized (i.e. no more available space) while there are still any updates still residing in the storage controller data cache waiting to be destaged to a repository volume.

As will be appreciated by one skilled in the art, the present invention may be embodied as a system, method, computer program product or any combination thereof. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

A block diagram illustrating an example computer processing system adapted to implement the data cache write delay method of the present invention is shown in FIG. 1. The computer system, generally referenced 10, comprises a processor 12 which may comprise a digital signal processor (DSP), central processing unit (CPU), microcontroller, microprocessor, microcomputer, ASIC or FPGA core. The system also comprises static read only memory 18 and dynamic main memory 20 all in communication with the processor. The processor is also in communication, via bus 14, with a number of peripheral devices that are also included in the computer system. Peripheral devices coupled to the bus include a display device 24 (e.g., monitor), alpha-numeric input device 25 (e.g., keyboard) and pointing device 26 (e.g., mouse, tablet, etc.)

The computer system is connected to one or more external networks such as a LAN or WAN 23 via communication lines connected to the system via data I/O communications interface 22 (e.g., network interface card or NIC). The network adapters 22 coupled to the system enable the data processing system to become coupled to other data processing systems or remote printers or storage devices through intervening private or public networks. Modems, cable modem and Ethernet cards are just a few of the currently available types of network adapters. The system also comprises magnetic or semiconductor based storage device 52 for storing application programs and data. The system comprises computer readable storage medium that may include any suitable memory means, including but not limited to, magnetic storage, optical storage, semiconductor volatile or non-volatile memory, biological memory devices, or any other memory storage device.

Software adapted to implement the data cache write delay method of the present invention is adapted to reside on a computer readable medium, such as a magnetic disk within a disk drive unit. Alternatively, the computer readable medium may comprise a floppy disk, removable hard disk, Flash memory 16, EEROM based memory, bubble memory storage, ROM storage, distribution media, intermediate storage media, execution memory of a computer, and any other medium or device capable of storing for later reading by a computer a computer program implementing the method of this invention. The software adapted to implement the data cache write delay method of the present invention may also reside, in whole or in part, in the static or dynamic main memories or in firmware within the processor of the computer system (i.e. within microcontroller, microprocessor or microcomputer internal memory).

Other digital computer system configurations can also be employed to implement the data cache write delay method of the present invention, and to the extent that a particular system configuration is capable of implementing the system and methods of this invention, it is equivalent to the representative digital computer system of FIG. 1 and within the spirit and scope of this invention.

Once they are programmed to perform particular functions pursuant to instructions from program software that implements the system and methods of this invention, such digital computer systems in effect become special purpose computers particular to the method of this invention. The techniques necessary for this are well-known to those skilled in the art of computer systems.

It is noted that computer programs implementing the system and methods of this invention will commonly be distributed to users on a distribution medium such as floppy disk or CD-ROM or may be downloaded over a network such as the Internet using FTP, HTTP, or other suitable protocols. From there, they will often be copied to a hard disk or a similar intermediate storage medium. When the programs are to be run, they will be loaded either from their distribution medium or their intermediate storage medium into the execution memory of the computer, configuring the computer to act in accordance with the method of this invention. All these operations are well-known to those skilled in the art of computer systems.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Data Cache Write Delay

In accordance with the invention, a delay value is maintained for each repository volume of the storage system coupled to the storage controller implementing the data cache write delay of the present invention. When an update is received by the storage controller, the storage controller first determines if the update requires any space allocation on the repository volume. If no allocation is required then update data is written directly to the data cache. If allocation is required then writing the update is delayed by the current delay value associated with the repository volume.

The delay value is zero or a low value when the repository volume has low utilization (i.e. plenty of available space). As the repository volume becomes more highly utilized (i.e. less space remaining), the data cache write delay value increases. Increasing the data cache write delay value delays sending a write acknowledgement for the update. Since the storage controller will not accept any further updates for the repository volume until the acknowledgement is sent, the method of the present invention reduces the possibility that there will still be updates remaining in the data cache waiting to be destaged to the repository volume when the repository volume is fully (i.e. 100%) utilized.

The method of the present invention analyzes the allocating destage average for each repository volume coupled to the storage controller. As discussed supra, an update received by the storage controller either requires or does not require storage allocation of data tracks on the repository volume. The allocating destage average is the average of how many tracks are allocated for each update received by the storage controller. The allocating destage average of a repository volume is a statistic helpful in forecasting future repository utilization and is used as a parameter when calculating the data cache write delay value associated with a repository volume.

When a repository volume is about to be fully utilized, data cache writes that may result destaging data on the repository volume are delayed by the repository volume's delay value. The data cache write delay reduces the number of updates in the data cache for updates that cause repository volume allocations when the repository volume is almost fully utilized. The advantage of the method of the present invention is that it does not affect the performance of data cache writes when utilization of the repository volume is low.

In a first embodiment of the present invention, a separate delay value is used for each repository volume couple to the storage controller. In a second embodiment of the present invention, the cache write delay is the maximum of all the delays calculated for all repository volumes coupled to the storage controller.

A sample delay function suitable for use by the present invention is $$G(f(D)+F) \qquad (1)$$

where F equals the number of free data tracks for repository volume y, D equals the allocating destage/second speed of repository volume y and f(D) is a polynomial delay function. When the repository volume has low utilization (i.e. plenty of space remaining), no delay is added to the writes. Alternatively, when the repository volume is fully utilized, the method of the present invention prevents any updates to the data cache requiring space allocation on the repository volume. This causes an infinite delay (i.e. for writing updates to the data cache), since no more updates can be written to the fully utilized repository volume.

An example polynomial function that can be used with Equation 1 is $$(C*D/F)^n \qquad (2)$$

where n is a constant value that we will be used to make the function polynomial and C is a constant value (C can be chosen to be equal to the time it takes to destage all the data that uses the repository volume which is modified in the data cache). When the function result is equal or greater than one, then all writes are suspended to the repository volume.

In an alternative embodiment of the present invention, a table is implemented instead of a function. The table implemented for this embodiment creates a mapping between input parameter values (e.g., number of free data tracks, destage speed, etc.) and their corresponding delay value.

A discussed supra, a goal of the present invention is to prevent a storage controller data cache from storing data that cannot be destaged to a repository volume because the repository volume is fully utilized. In addition to implementing a delay function, the method of the present invention increases the frequency that the data cache is scanned for updates that are then destaged to their respective repository volumes. By destaging updates from the data cache faster than updates are written to the data cache, the data cache is available to accept updates from other lightly utilized repository volumes coupled to the storage controller, thereby impacting only highly utilized repository volumes.

Figure 2:
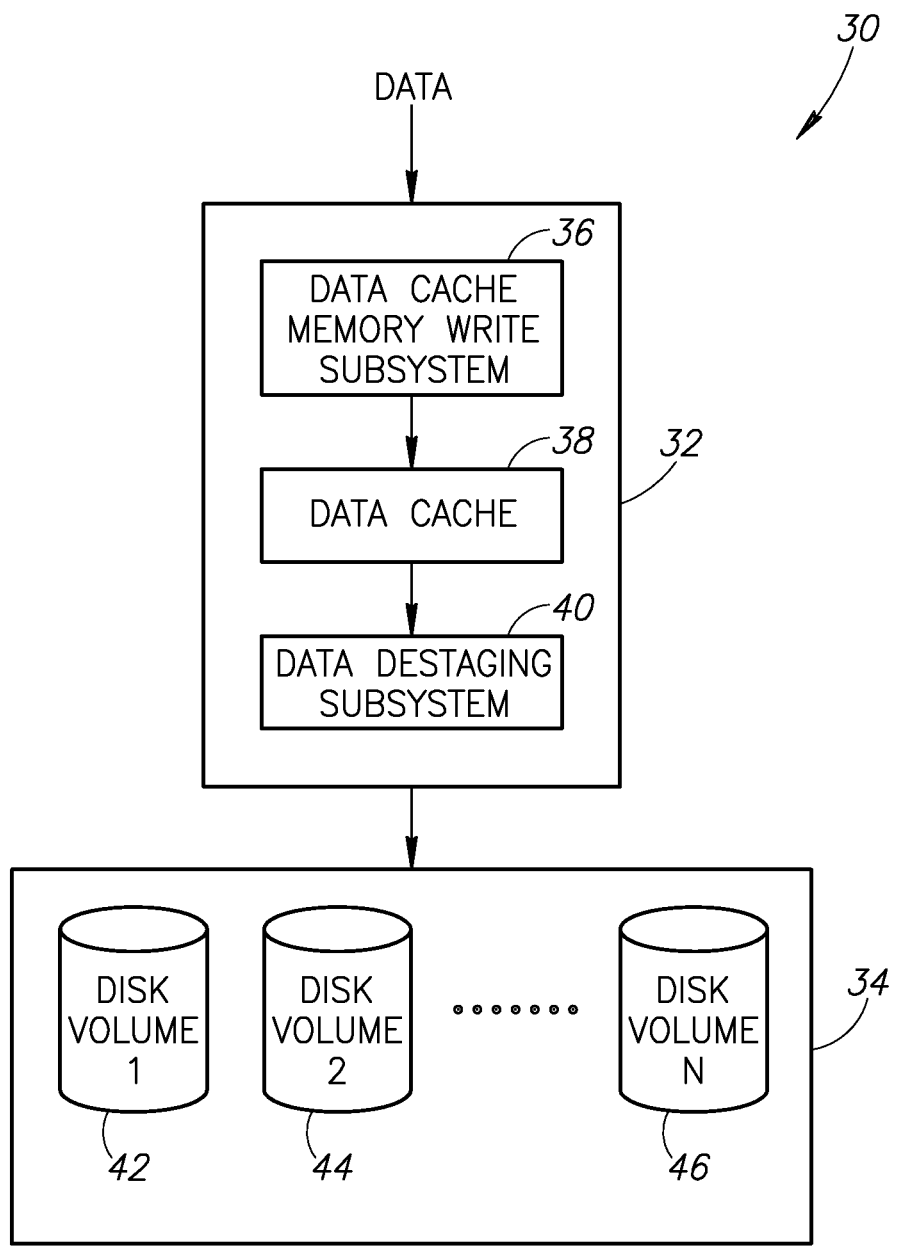
FIG. 2 is a block diagram illustrating an example storage system suitable to implement the storage controller data cache write delay mechanism of the present invention.

A block diagram illustrating an example storage controller suitable for use with the present invention is shown in FIG. 2. The block diagram, generally referenced 30, comprises storage controller 32 and storage system 34. Storage controller 32 is further comprised of data cache memory write subsystem 36, data cache 38 and data destaging subsystem 40. Storage system 34 further comprises repository volumes 42, 44 and 46.

In operation, an update is received by the storage controller and is delayed (if necessary) by the cache memory write subsystem prior to being written to the data cache. Once the update is written to the data cache, it is destaged from the data cache to its associated repository volume by the update destaging subsystem.

Figure 3:
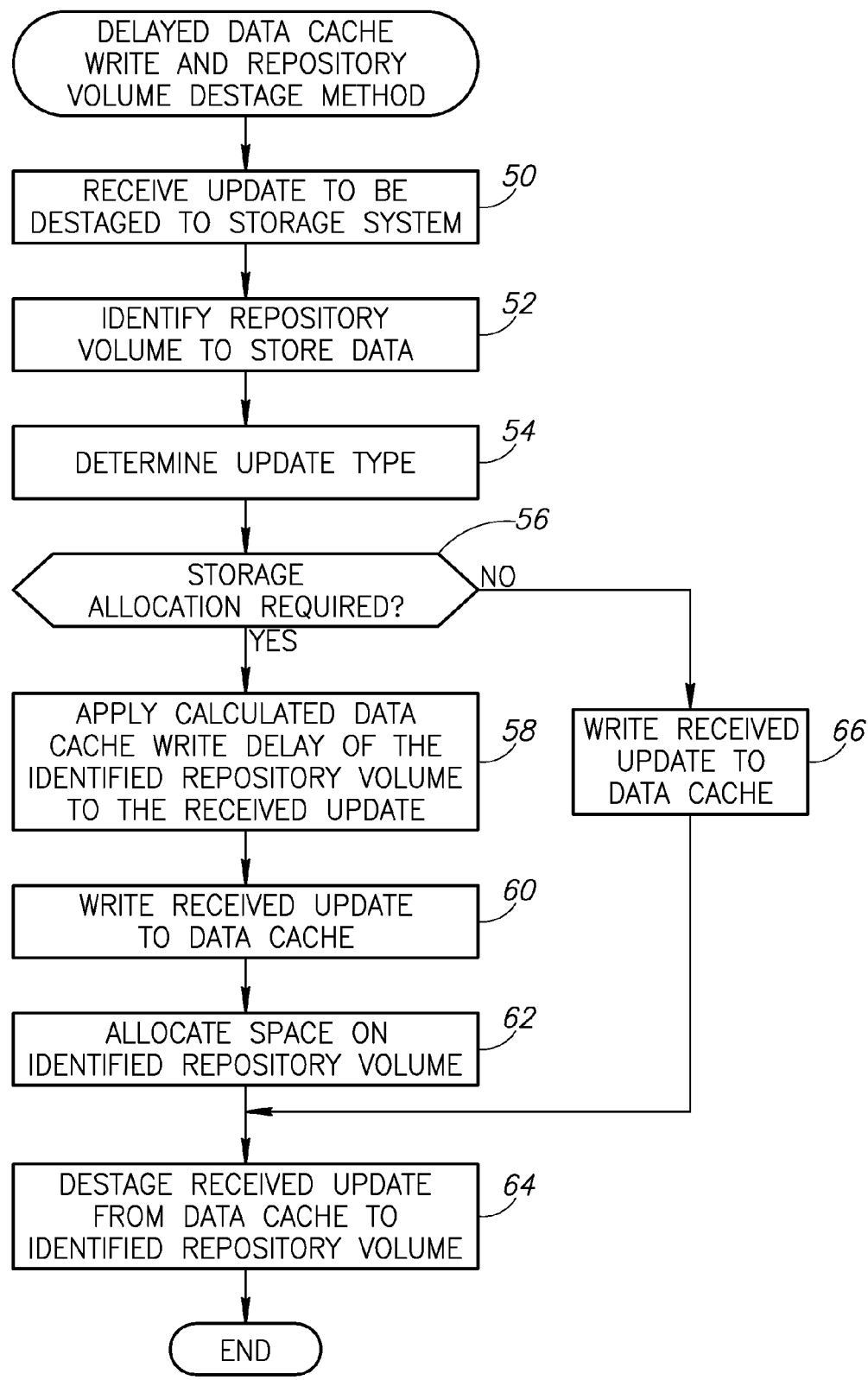
FIG. 3 is a flow diagram illustrating the delayed data cache write and repository volume destage method of the present invention.

A flow diagram illustrating the delayed data cache write and repository volume destage method of the present invention is shown in FIG. 3. The storage controller first receives an update to be destaged to the storage system (step 50). The storage controller then identifies the repository volume for the update (step 52) and determines the type of the update (step 54). Update types include either requiring storage allocation on the repository volume, not requiring storage allocation on the repository volume, or a combination of the two (i.e. an update comprising both data that requires a storage allocation on a repository volume and data that does not require a storage allocation on a repository volume). If a storage allocation is required on the repository volume (step 56), the calculated data cache write delay value associated with the identified repository volume is applied to the received update (step 58). After a period of time equal or greater to the applied delay, the update is written to the data cache (step 60). The required space is then allocated on the identified repository volume (step 62) and finally, the received update is destaged from the data cache to the repository volume (step 64). If no storage allocation is required (step 46), then the received update is written to the data cache without delay (step 66) and the method of the present invention continues with step 64.

Figure 4:
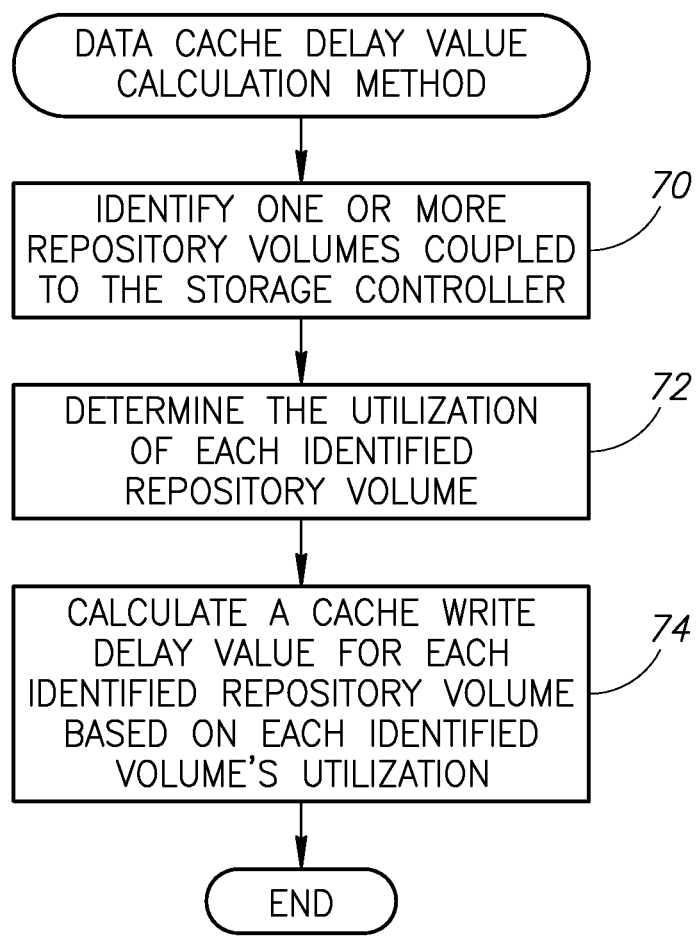
FIG. 4 is a flow diagram illustrating the data cache write delay value calculation method of the present invention.

A flow diagram illustrating the data cache write delay value calculation method of the present invention is shown in FIG. 4. First, one or more repository volumes coupled to the storage controller are identified (step 70). The storage utilization of each identified repository volume is then determined (step 72). Finally, using the determined storage utilization(s) as an input parameter, a data cache delay value is calculated for each identified repository volume (step 74).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A method of storing a data element in a data cache, said data element to be destaged from said data cache to a repository volume of a storage system, said storage system comprising one or more repository volumes, the method comprising the steps of:
   assigning a delay value to be associated with said data element based on a characteristic of the destination repository volume; and
   delaying writing of said data element to said data cache by a time duration determined in accordance with said assigned delay value.

2. The method according to claim 1, wherein said data cache comprises non-volatile storage.

3. The method according to claim 1, wherein a separate delay value is calculated for each repository volume of said storage system.

4. The method according to claim 1, wherein said delay value is equal to or greater than zero in the event said destaging said data entry requires allocation of one or more additional storage tracks in said repository volume of said storage system.

5. The method according to claim 1, wherein said delay value increases as available storage of said repository volume of said storage system decreases.

6. The method according to claim 1, wherein said delay value equals zero in the event writing said data element does not require allocation of any additional storage tracks in said repository volume of said storage system.

7. A computer program product for storing a data element in a data cache, said data element to be destaged from said data cache to a repository volume of a storage system, said storage system comprising one or more repository volumes, comprising:
   a non-transitory computer usable medium having computer usable code embodied therewith, the computer program product comprising:
   computer usable code configured for assigning a delay value to be associated with said data element; and
   computer usable code configured for delaying writing of said data element to said data cache by a time duration determined in accordance with said assigned delay value,
   wherein said delay value is selected based on at least one of: a determination that said destaging said data entry requires allocation of one or more additional storage tracks in said repository volume of said storage system; and an amount of available storage of said repository volume of said storage system.

8. The computer program product according to claim 7, wherein said data cache comprises non volatile storage.

9. The computer program product according to claim 8, wherein a separate delay value is calculated for each said repository volume of said storage system.

10. The computer program product according to claim 7, wherein said delay value is equal to or greater than zero in the event said destaging said data entry requires the allocation of one or more additional storage tracks in said repository volume of said storage system.

11. The computer program product according to claim 7, wherein said delay value increases as the available storage of said repository volume of said storage system decreases.

12. The computer program product according to claim 7, wherein said delay value equals zero in the event writing said data element does not require allocation of any additional storage tracks in said repository volume of said storage system.

13. A storage controller, comprising:
   a communications subsystem operative to receive one or more data elements to be destaged to a repository volume of a storage system;
   a data cache subsystem operative to store said one or more data elements; and
   a scheduling subsystem operative to delay writing each data element to said data cache subsystem by a time duration based on a characteristic of the repository volume.

14. The storage controller according to claim 13, wherein the time duration is based on a utilization of the repository volume of the storage system.

15. The storage controller according to claim 13, wherein said time duration comprises a calculated delay value.

16. The storage controller according to claim 15, wherein a separate delay value is calculated for each said repository volume of said storage system.

17. The storage controller according to claim 15, wherein said calculated delay value is equal to or greater than zero in the event said destaging said data entry requires allocation of one or more additional storage tracks in said repository volume of said storage system.

18. The storage controller according to claim 15, wherein said calculated delay value increases as available storage of said repository volume of said storage system decreases.

19. The storage controller according to claim 15, wherein said calculated delay value equals zero in the event destaging said data element does not require allocation of any additional storage tracks.

20. A method of storing one or more data elements in a repository volume of a storage system, said storage system comprising repository volumes, the method comprising the steps of:
   assigning a delay value associated with each data element, each data element being associated with one of the repository volumes;
   writing each data element to a data cache after a time delay determined in accordance with its said associated delay value; and
   destaging each said written data element from said data cache to the repository volume associated therewith,
   wherein said delay value associated with each data element is selected based on at least one of: the associated repository volume; a determination that said destaging said data entry requires allocation of one or more additional storage tracks in the associated repository volume; and an amount of available storage of the associated repository volume.

21. The method according to claim 20, wherein said data cache comprises non-volatile storage.

22. The method according to claim 20, wherein a separate delay value is calculated for each said repository volume of said storage system.

23. The method according to claim 20, wherein said delay value is equal to or greater than zero in the event said destaging said data entry requires allocation of one or more additional storage tracks in said repository volume of said storage system.

24. The method according to claim 20, wherein said delay value increases as available storage of said repository volume of said storage system decreases.

25. The method according to claim 20, wherein said delay value equals zero in the event writing said data element does not require allocation of any additional storage tracks in said repository volume of said storage system.

* * * * *